United States Patent [19]
Liebscher

[11] 3,866,256
[45] Feb. 18, 1975

[54] METHOD OF MANUFACTURE OF SHOES

[75] Inventor: Anton I. Liebscher, Waynesville, N.C.

[73] Assignee: Ro-Search, Incorporated, Waynesville, N.C.

[22] Filed: Jan. 18, 1973

[21] Appl. No.: 324,785

Related U.S. Application Data

[63] Continuation-in-part of Ser. No. 78,530, Oct. 6, 1970, abandoned, which is a continuation-in-part of Ser. No. 43,394, June 4, 1970, abandoned.

[52] U.S. Cl. ............................................. 12/142 RS
[51] Int. Cl. .............................................. A43d 9/00
[58] Field of Search ............ 12/142 R, 142 RS, 145; 264/55, 54, 45, 47, 78

[56] References Cited
UNITED STATES PATENTS

| | | | |
|---|---|---|---|
| 3,052,903 | 9/1962 | LaRose | 12/142 RS |
| 3,390,213 | 6/1968 | Rollman et al. | 12/142 RS |
| 3,758,903 | 9/1973 | Auberry et al. | 12/142 RS |

*Primary Examiner*—Patrick D. Lawson
*Attorney, Agent, or Firm*—Dos T. Hatfield

[57] ABSTRACT

A method to improve the quality of shoes with elastomer soles molded directly to the upper by a sequence of movements of sections or segments of the cavity forming mold parts adapted for the method disclosed.

2 Claims, 2 Drawing Figures

PATENTED FEB 18 1975 3,866,256

METHOD OF MANUFACTURE OF SHOES

BACKGROUND OF THE INVENTION

The customary method of molding soles of elastomeric material to uppers encounters difficulties with uppers of stiffer material or of varied thickness. Unsatisfactory sealing between upper and side frame lip and lack of conformity to the mold last result easily in poor quality of the finished shoes.

According to the present invention, improved quality without increased costs is obtained by segmenting at least one of the cavity forming mold parts and using movement of such segments in relation to the mold cavity during the actuation of the mold to secure the higher accuracy needed for better quality.

Other features and advantages of the invention will be apparent with reference to the following specification and drawing.

DESCRIPTION OF THE PREFERRED EMBODIMENT

Figure 1:
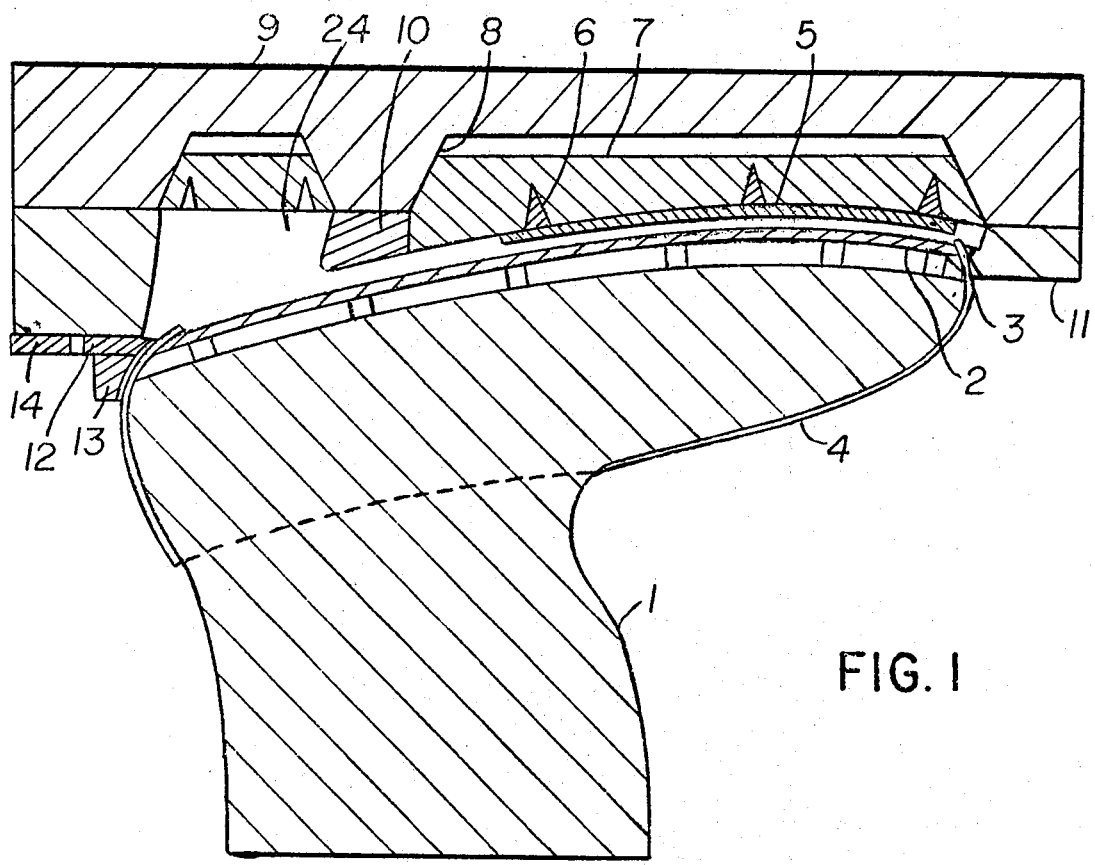
FIG. 1 is a cross section of a shoe in a closed mold.

The customary molds for direct molding of elastomer soles to uppers comprise a mold last 1, a split side frame mold part 11 and a sole bottom mold part 9, sometimes shaped as a plate as shown, sometimes shaped as a piston surrounded by the side frame halves 11. The upper 4 is placed on the last and elastomeric material for the sole and heel 24 is molded in the closed cavity to the upper.

According to the invention, the sole bottom plate 9 is segmented by having inserts 7 movable in relation to the surrounding mold part 9. In the manufacture of golf shoes with spikes 6 carried by a plate 5, as shown in the example of FIG. 1, these spikes, etc. can be located in the segment 7 and placed atop the rubber mix or other elastomer before closing the mold. By this closing movement the segment 7 by means of the taper surfaces 8 is guided into the desired final position shown in the drawing even if the flow of the elastomer tends to deflect the spikes or the plate 5.

Figure 2:
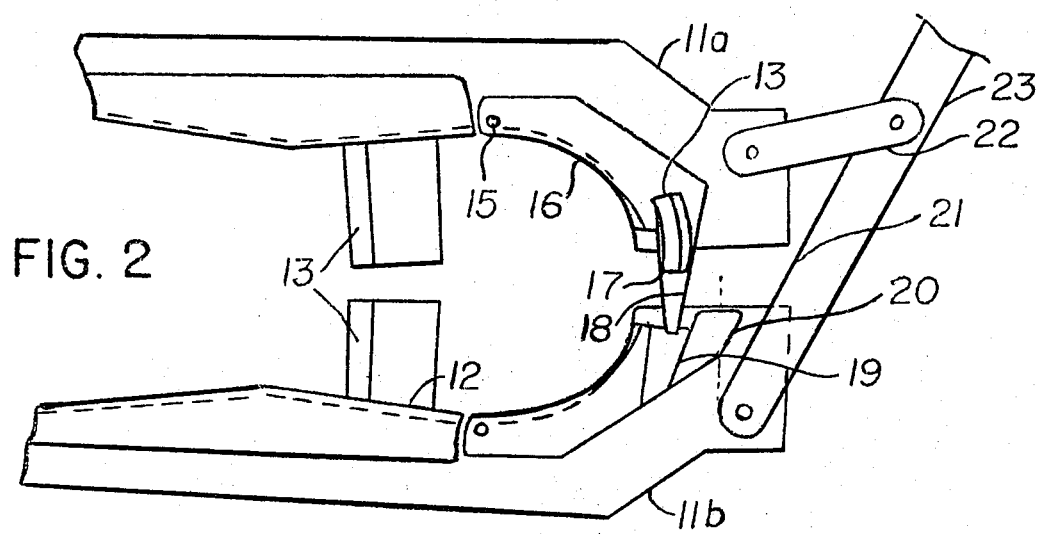
FIG. 2 is a top view of a split side frame, opened to show segments of the frame halves.

Another segment 10 of the sole bottom mold part forming the heel breast is according to the invention movable in relation to part 9. It could be located again by taper surfaces in mold part 9, or as shown in FIG. 2, the segment 10 could be secured to the mold part 11. This mold part 11, usually split lengthwise into halves 11a and 11b, has a lip plate 12 for sealing contact with the upper 4. Again, according to the invention, a segment 16 is by means of the hinge 15 made movable in relation to part 11a forming the side wall of the mold cavity. The segment 16 carries a pressure pad 13 to iron out the back seam of the upper, as well as a projection 17 with a cam surface 18 mating a cam surface 19 of the movable segment of the other frame half 11b. This other segment has a cam surface 20 touching the surface 21 of the closing lever 23 when the latter with toggle 22 closes and locks the frame halves 11a and 11b. Resilient means such as springs (not shown) are used for automatic adjustment of the movement of these segments towards the mold cavity for varied thicknesses of the upper quarter.

Similar segments movable in relation to the side frame halves are provided for the toe part of the mold if needed there. In some cases the entire lip plate 12 might be a segment movable in relation to the corresponding side frame half, even with a reversal of the sequence of moving against the last, i.e. in closing the side frame moving the lip plate halves against the upper and ending up moving the side frame halves into their final position.

The invention provides further a segmentation of the mold last into a sole plate 2 separated from the last 1 by spacers 3 or an insulating layer. This allows accommodation of different heat requirements for the elastomer and for the material of the upper. For example, if the sole is molded by injection of melted thermoplastics, it is desirable to shorten the chill time by keeping the sole surface of the last cool. At the same time, it might be desirable to heat the last to shrink a preferably mulled leather upper to a perfect fit.

By substituting cylindrical guide surfaces (not shown) for the insert segment 7, it becomes possible to use the relative movement between the center segment and the rim forming sole bottom part 9 for further quality improvement. For example, the sole plate might be advanced and pressed against the welt of a pre-welted upper before withdrawing the rim part sufficiently to form a cavity for injection molding of an elastomer rim to the securely flattened welt. Thereafter, the center part of the sole plate might be withdrawn to complete the molding of the sole. Or, in another execution of the invention, the rim part of the sole plate is advanced to flatten the welt and hold it so that while the center part of the sole in contact with the inner margin of the welt is molded. For some welt material it might be sufficient to advance the entire sole plate to force the welt into the desired position and then to withdraw the entire plate to mold the entire sole in a single shot. Where the two shot molding is used, the sole rim might differ in color or other features from the center of the sole.

What is claimed is:

1. A method of manufacturing shoes comprising lasting an upper on a last, placing a split side frame which has a main portion and a heel portion against the peripheral margin of the upper, closing and thereby moving the side frame to exert inward pressure transverse to the sole of the last on the bottom margin of the side portion of the upper and moving the heel portion relative to the main portion and further exerting differential pressure on the heel portion of the upper lengthwise of the sole of the last.

2. A method of manufacturing shoes comprising placing and lasting an upper on a last of a sole attaching device comprising sole surrounding members, placing said members against the bottom margin of said upper and forcing a segment of a member by moving it in relation to the other segment of said member against said bottom margin for supplementary lasting of said margin on said last, said members consisting of a split side frame with separate segments, characterized in that by closing and thereby moving said side frame inwardly, pressure is exerted against the side portion of the upper transverse to the sole of the last and a differential pressure is exerted onto another portion of the upper lengthwise of the sole of the last.

* * * * *